G. E. STEVENS.
ADJUSTABLE MOUNTING FOR AUTOMOBILE STARTING MOTORS AND GENERATORS.
APPLICATION FILED DEC. 10, 1914.
1,191,624. Patented July 18, 1916.
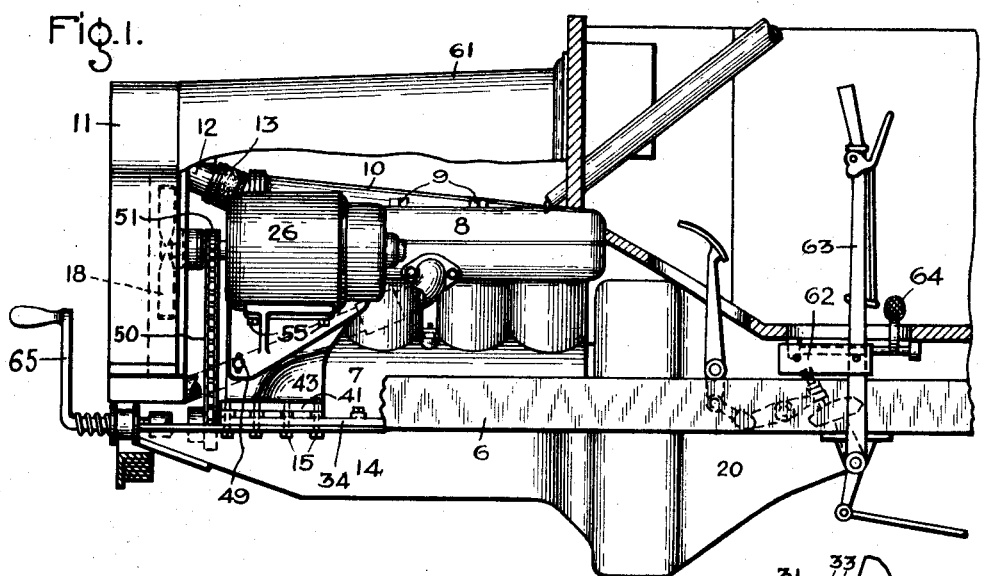
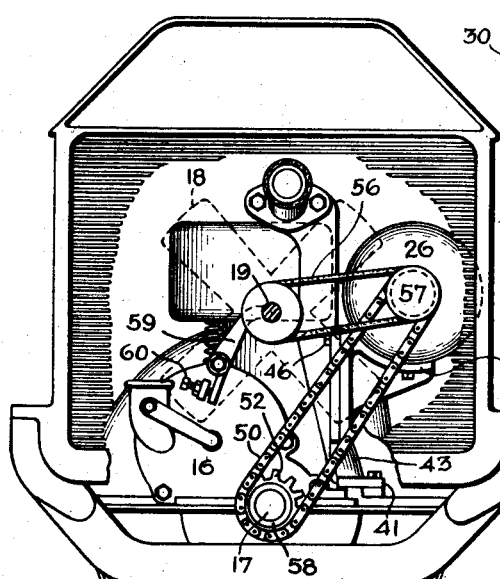
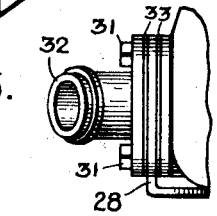
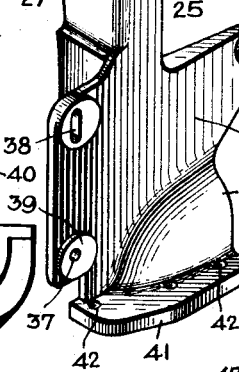
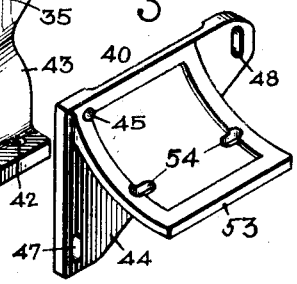
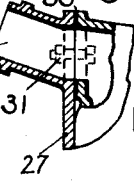
Witnesses: Inventor,
George E. Stevens,
by Atty.

UNITED STATES PATENT OFFICE.

GEORGE E. STEVENS, OF LYNN, MASSACHUSETTS, ASSIGNOR TO GENERAL ELECTRIC COMPANY, A CORPORATION OF NEW YORK.

ADJUSTABLE MOUNTING FOR AUTOMOBILE STARTING-MOTORS AND GENERATORS.

1,191,624.    Specification of Letters Patent.    Patented July 18, 1916.

Application filed December 10, 1914. Serial No. 876,449.

*To all whom it may concern:*

Be it known that I, GEORGE E. STEVENS, a citizen of the United States, residing at Lynn, county of Essex, State of Massachusetts, have invented certain new and useful Improvements in Adjustable Mountings for Automobile Starting-Motors and Generators, of which the following is a specification.

At the present time there is an almost universal demand by owners and operators of automobiles for electric starting motors and lighting generators. This demand extends to those using old as well as new machines. One of the many problems presented in equipping an automobile, whether it be new or old, with a starting motor and electric generator, is to provide a suitable mounting or support for the same, and in particular to provide one which can be applied to the machine at a minimum cost for labor and in a relatively short time, and this without modification of any of its essential parts. Also the mounting should be of such character that the motor or generator can be adjusted toward and away from the main shaft to adjust the driving connection between the two, and also axially to bring the driving and the driven gears or sprockets into proper alinement. Further, the mounting or support must be composed of few simple parts of a rugged nature so arranged that neither it nor the machine shall interfere with the accessibility of the parts of the engine, and the initial cost must be as low as possible consistent with the work to be performed.

The object of my invention is to provide a support or mounting for automobile starting motors or electric generators which will fulfil the exacting requirements above specified.

In the accompanying drawing which illustrates one of the embodiments of my invention, Figure 1 is a view in side elevation of the front part of an automobile fitted with my improved apparatus; Fig. 2 is a front view of the same with a part of the radiator broken away; Fig. 3 is a perspective view of a supporting bracket; Fig. 4 is a perspective view of a saddle adapted to carry a dynamo electric machine and be mounted on the bracket; Fig. 5 is a detail plan view showing the fastening means for the upper end of the bracket, and Fig. 6 is a sectional view of a slight modification.

I shall describe my invention in connection with a Ford automobile since it has great utility in that connection, but it is to be understood that the apparatus is capable of wider application.

6 indicates one of the side frame bars of the chassis upon which the internal combustion engine 7 is mounted in any suitable way. The engine shown is of the four cylinder type having a removable head 8 which is secured in place by bolts 9 in the ordinary manner.

10 indicates a conduit formed in the head through which cooling water from the cylinder jackets passes to or from the radiator 11. Between this conduit and a short pipe 12 connected to the radiator is a piece of rubber hose 13. Below the engine is a crank casing 14 which is secured to the engine proper by bolts 15, the plane of division being horizontal. In front of the engine is a commutator 16 driven indirectly from the main crank shaft 17 and a fan 18 shown in dotted lines, the latter being mounted on the shaft 19. In the rear of the engine is a casing 20 containing the fly wheel, clutch, change speed gearing, etc. All of the parts thus far described are old and well known.

25, Fig. 3, indicates a bracket which forms a part of the support or mounting for the dynamo-electric machine 26, in this case a motor, said bracket extending from a point in front of the engine to one side thereof. The motor serves to start the engine into operation and after the latter is operating may serve as a generator to furnish current to charge the storage battery and also for lighting. The bracket is provided with a substantially flat and vertically extending member or portion 27 that has a flange 28 at its upper end, said flange occupying a plane substantially perpendicular to that of the shaft of the engine. In the flange is a large opening 29 through which the cooling water passes in flowing between the engine and radiator. The flange is also provided with two substantially vertical slots 30 through which pass the clamping bolts 31, Fig. 5, that unite the short conduit 32 with the conduit 10 in the head of the engine. On the opposite sides of the flange are gaskets 33 which, when the bolts 31 are screwed into place, prevent the escape of water around the flange. By this arrangement I am able to utilize as securing means bolts that are already in the machine. As the flange is relatively thin it can be readily slipped between the flange on the engine head conduit and that on the pipe leading to the radiator, and since the rubber hose 13 is included in the connection this presents no difficulties. The hose can either be compressed slightly or pushed a little farther on to one of the conduits. By providing slots 30 in the flange which are larger than the body of the bolts 31, I am able to compensate for any ordinary variation in the relative position of the conduit 10; for any ordinary variation in the distance between said conduit and the flange 34 located at the plane of division between the engine proper and the crank casing; for any ordinary variation in the length of the bracket, and for relative expansion and contraction of the bracket and engine. Instead of making the short conduit 32 and its flange separately they can be formed integral with the part 27 as shown in Fig. 6. This has the advantage of reducing the number of parts and of somewhat simplifying the work of assembling. The bracket is also provided with a member or portion 35 located wholly at one side of the engine and which occupies a plane substantially perpendicular to that of the member or portion 27. At the point where the two portions unite the cross-section is T-shaped, of which the portion 35 forms the head. The portion 35 is provided with two screw-threaded bolt holes 36 and 37 and a slot 38 located in bosses 39, the purpose of which will appear later. By providing these bosses a three-point suspension is provided for the motor saddle 40, thus insuring a firm seat for the latter. The lower end of the portion 35 terminates in an out-turned flange 41 that rests on the flange 34 on the base of the engine. In this flange are screw-threaded holes 42 having the same pitch distance as those in the flange 34, said holes receiving the bolts that are normally employed to secure the crank casing 14 to the engine proper. Where the engine is provided with bolts that extend through the flange and have nuts on their upper ends, the same bolts may be employed for securing the bracket, the screw-threaded holes in the bracket serving the purpose of nuts. In order to make the bracket closely fit the engine it may be provided, where necessary on account of the shaking of the engine, with a curved part 43 connecting the portion 35 with the flange 41.

40 indicates the saddle which comprises a vertical portion 44 substantially triangular in form that is adapted to be clamped on the three bosses 39. In this portion is a hole 45 to receive a body bound bolt, the end of which passes through the slot 38 in the bracket and receives its nut 46. It is also provided with two vertical slots 47 and 48, to receive body bound bolts 49 mounted in the bracket. By reason of the construction described the saddle has a three-point suspension and can be raised and lowered by releasing the nuts on the attaching bolts so as to adjust the relation between the shaft of the motor and that of the engine. These features of construction permit of adjusting the driving connection between the shafts of the engine and dynamo electric machine. In the construction shown a so-called silent chain 50 is employed as a driving means, but other forms of gearing can be provided. The motor shaft has a sprocket 51 and the engine shaft a sprocket 52, the latter being in addition to the usual equipment of the engine. The saddle is also provided with a portion 53 that projects outwardly from the rear and vertical portion and has a curved upper surface that closely conforms to the curvature of the frame of the motor. In said portion are two longitudinal slots 54 through which pass bolts 55 that enter screw-threaded holes in the motor frame. By reason of this construction the motor as a whole can be moved forward or backward to bring the motor sprocket 51 into exact alinement with the engine sprocket. If due to any inaccuracies in workmanship either in the engine or the bracket or both and the shaft of machine 26 is not exactly parallel with the engine shaft, shims may be located at proper points between the machine casing and the saddle.

On the fan shaft is a pulley for driving the fan. It is connected by a belt 56 with a pulley 57 on the motor shaft, but it may be driven from the pulley 58 on the engine shaft. The former arrangement has the advantage, however, of largely removing the belt from the effects of oil and dirt and facilitates replacement in the event of its slipping off of its pulleys. To adjust the tension of the belt the fan shaft 19 is carried by an arm 59 which can be adjusted angularly by the screw adjustment 60. Both the engine and starting motor are inclosed by the usual hood or bonnet 61 and, therefore, the parts can be readily inspected, adjusted or repaired.

In order to control the starting motor a switch 62 is provided that may be operated by the emergency brake lever 63 or by an auxiliary foot pedal 64. The particular means for controlling the motor form no part of the present invention and are made the subject matter of a separate application for Letters Patent, Serial No. 877,696 filed December 17, 1914. The usual starting crank 65 can be retained or not as desired.

My improved arrangement has, as practical experience has demonstrated, the advantage that it can be readily applied to existing, as well as to new, machines without modification of any of its essential parts. The mounting or support itself is simple and rugged in construction, there being no parts liable to break or get out of order.

The saddle, and, therefore, the dynamo electric machine, can be adjusted vertically, and said machine can be adjusted horizontally, thereby insuring proper relation of the driving and driven parts. Furthermore, and this is of great practical importance, the head of the engine can be removed to give access to the interior parts thereof without disturbing the dynamo electric machine, and driving connection, or alinement thereof. By using the same bolt spacing for the bracket as is used in the engine no additional holes have to be drilled and tapped, and in many instances even the same bolts now employed may be used. Since the machine is carried by a bracket that is supported at the top and bottom by the engine itself, it follows that the relation between the parts will be preserved at all times. The machine can, in certain cases, be mounted on either side of the engine, but by preference it is on the side opposite from the carbureter and timer so as not to interfere with the accessibility thereof.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. The combination with an engine, of a dynamo electric machine for starting it, a means for attaching the motor to the engine comprising one part which is attached to the engine itself and a second part which carries the motor and is vertically adjustable as a whole relative to the first part, and means for transmitting motion between the motor and engine shafts.

2. The combination with an engine, of a dynamo electric machine for starting it, a bracket which is attached to the engine, a saddle which carries said machine, vertically adjustable means for securing the saddle to the bracket, and means for transmitting motion between the machine and engine shafts.

3. The combination with an engine, of a dynamo electric machine for starting it, a bracket which is attached to the engine, a saddle which carries said machine and is adjustable vertically thereon, means permitting relative longitudinal adjustment of said machine and saddle, and means for transmitting motion between the machine and engine shafts.

4. The combination with an internal combustion engine, of a dynamo electric machine, means for transmitting motion from the shaft of one to the other, said machine being located at one side of the engine, a bracket that is attached top and bottom to the engine, and a saddle for said machine that is adjustably supported by the bracket to permit of adjustment of the motion transmitting means.

5. The combination with an internal combustion engine having a conduit for conveying its cooling fluid, and a flange to which the crank casing is secured, of a bracket that is attached at its upper end to said conduit and at its lower end to said flange, a cradle mounted on the bracket, a dynamo electric machine carried by the cradle, and a driving connection between the engine and said machine.

6. The combination with an engine, of a bracket rigidly secured thereto, a saddle which is adjustably attached to the bracket at three points, a dynamo electric machine carried by the bracket, and a driving connection between the engine and machine shafts.

7. The combination with an engine, of a bracket rigidly secured thereto, a saddle which is adjustably attached to the bracket at three points, a dynamo electric machine carried by the bracket, means for securing the dynamo electric machine to the saddle which permit of relatively axial adjustment of the machine and saddle, and a driving connection between the engine and machine shafts.

8. The combination with an internal combustion engine, of a bracket comprising a portion that is secured to the head of the engine at the top and to the frame of the engine at the bottom, and a second portion that extends at right angles to the plane of the first, a saddle that extends parallel with the second portion and is adjustably secured thereto, a dynamo electric machine that is adjustably secured to the saddle, and a driving connection between the engine and machine shafts.

9. The combination with an internal combustion engine having a flanged conduit for conveying its cooling water, a bracket, a part of which is located between the parts of the flanged conduit and forms a part thereof, means for attaching the lower end of the bracket to the engine base, a saddle carried by the bracket, a dynamo electric machine supported by the saddle, and a driving means between the shafts of the engine and the machine.

10. The combination with an internal combustion engine having an air circulating fan and conduit means for conveying cooling fluid to the engine, of a bracket situated at one side of the center of the engine and attached at one point to said conduit means, a dynamo electric machine supported by the bracket, and driving connections between the shaft of the dynamo electric machine and the engine and fan shafts.

11. A support of the character described comprising a vertically disposed member which is adapted to be secured to an engine at its upper end, a second member which occupies a plane substantially perpendicular to the first and has holes at its lower end to receive retaining bolts, and a saddle that is adjustably secured to the second member.

12. The combination with an internal combustion engine having a flange on its lower part and a conduit means for conveying its cooling fluid, of a bracket that is supported by said flange and also by said conduit means, a cradle carried by the bracket, a dynamo electric machine carried by the cradle, and a driving connection between the engine and said machine.

13. The combination with an internal combustion engine having a conduit for conveying its cooling fluid and means for attaching the conduit to the engine, of a bracket that is secured to the engine frame at one point and by said conduit attaching means at another, a dynamo electric machine which is supported by the bracket, and a driving connection between the engine and said machine.

14. The combination with an internal combustion engine having a flanged conduit for its cooling fluid and bolts which pass through the flange for attaching the conduit to the engine, of a bracket that is secured to the engine at one point by said flange attaching bolts, means for supporting the base of the bracket, a dynamo electric machine carried by the bracket, and a driving connection between the engine shaft and the rotor of said machine.

15. The combination with an internal combustion engine having a flanged conduit at its front end for its cooling fluid and means for attaching it to the engine, of a bracket located at the side of said engine and having a vertically extending part which extends in front of said engine and is secured in place by said attaching means, means for attaching the bracket at its lower end to the engine frame, a dynamo electric machine carried by the bracket, and a driving connection between the engine shaft and the rotor of said machine.

In witness whereof, I have hereunto set my hand this 7th day of December, 1914.

GEORGE E. STEVENS.

Witnesses:
JOHN A. MCMANUS, Jr.,
JOHN T. BEECHLYN.

Copies of this patent may be obtained for five cents each, by addressing the "Commissioner of Patents, Washington, D. C."